US 6,741,557 B1

(12) United States Patent
Petit

(10) Patent No.: US 6,741,557 B1
(45) Date of Patent: May 25, 2004

(54) CELL DISCARD METHOD

(75) Inventor: Guido Henri Marguerite Petit, Antwerp (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/243,452

(22) Filed: Feb. 3, 1999

(30) Foreign Application Priority Data

Feb. 5, 1998 (EP) ............................................. 98400259

(51) Int. Cl.[7] .............................................. H04L 12/26
(52) U.S. Cl. ........................................ 370/230; 370/252
(58) Field of Search .............................. 370/229–230.1, 370/231, 232–236, 252, 255, 395.1, 429, 395.2, 395.42, 412, 413, 395.21, 395.43; 709/230, 235, 236

(56) References Cited

U.S. PATENT DOCUMENTS

| | | | |
|---|---|---|---|
| 5,313,454 A | | 5/1994 | Bustini et al. |
| 5,313,579 A | * | 5/1994 | Chao ........................ 370/230.1 |
| 5,335,222 A | * | 8/1994 | Kamoi et al. ................ 370/230 |
| 5,426,640 A | * | 6/1995 | Hluchyj et al. .............. 370/235 |
| 5,524,006 A | * | 6/1996 | Hluchyj et al. .............. 370/233 |
| 5,541,913 A | * | 7/1996 | Witters et al. ............. 370/235.1 |
| 5,568,468 A | * | 10/1996 | Ogasawara et al. .......... 370/230 |
| 5,666,353 A | | 9/1997 | Klausmeier et al. |
| 5,764,641 A | * | 6/1998 | Lin ............................. 370/412 |
| 5,793,747 A | * | 8/1998 | Kline .......................... 370/230 |
| 5,822,540 A | * | 10/1998 | Caldara et al. ............... 709/235 |
| 5,953,318 A | * | 9/1999 | Nattkemper et al. ......... 370/236 |
| 6,072,773 A | * | 6/2000 | Fichou et al. ................ 370/230 |
| 6,243,359 B1 | * | 6/2001 | Roy et al. .................... 370/230 |
| 6,266,327 B1 | * | 7/2001 | Hernandez-Valencia .... 370/252 |
| 6,389,019 B1 | * | 5/2002 | Fan et al. .................... 370/233 |

OTHER PUBLICATIONS

M. Gerla et al, Lan/Man Interconnection to ATM: A Simulation Study One World Through Communications, Florence, May 4–8, 1992, vol. 3, No. Conf. 11, Jan. 1, 1992, Institute of Electrical and Electronics Engineers, pp. 2270–2279, XP000300352.

"Traffic and Congestion Control in ATM networks", pp. 302–340, Asynchronous Transfer Mode: Solution for Broadband ISDN.

* cited by examiner

Primary Examiner—Steven H. D Nguyen
Assistant Examiner—Phuongchau Ba Nguyen
(74) Attorney, Agent, or Firm—Sughrue Mion, PLLC

(57) ABSTRACT

A first discarding device is coupled to a second discarding device. This first discarding device can be a traffic policer or alternatively a network buffer. The second discarding device is a network buffer. A cell stream is supplied to the first discarding device. The system determines if the incoming cells are in accordance with the predetermined criteria and discards this cell, if this cell is not in accordance with the criterion. By discarding cells of a frame, this frame is corrupted and marked with a corrupted frame indicator, by the first discarding device. Afterwards the second discarding device may discard the remaining cells of the marked frame. If the first discarding device is a traffic policer, the traffic policer checks the conformance of the incoming cells according to conformance criterion and alternatively if the first discarding device is a network buffer it checks the conformance of the incoming cells according to some congestion determining criteria.

6 Claims, 1 Drawing Sheet

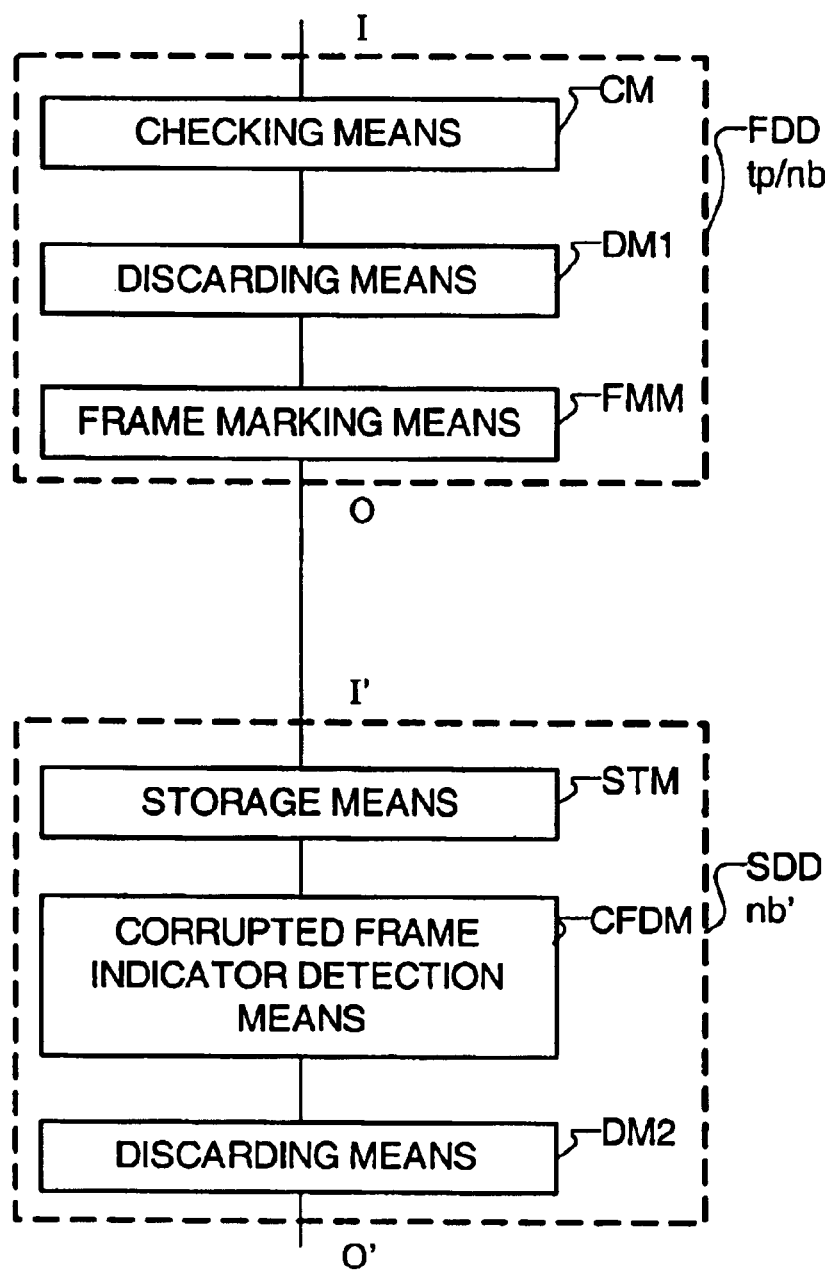

CELL DISCARD METHOD

The present invention relates to a cell discard method for discarding of buffered fragmented frames within a communications network as described in the preamble of claim 1, and related devices as described in the preambles of claim 4 and claim 6.

Such a cell discard method is already known in the art, e.g. from the section *"Traffic and Congestion Control in ATM Networks"*, pages 302–340 in Asynchronous Transfer Mode: Solution for Broadband ISDN, third edition, from the author Martin de Prycker. Therein, a cell based traffic policing method called Usage Parameter Control (UPC), containing the steps of checking cells called determining cells to be conforming or non-conforming and discarding cells called cell discarding is described.

Since in a cell based discard method only single cells from a frame are discarded, the frame is left incomplete in the network. Since incomplete frames are useless from an application point of view, hence the presence of these frames decreases network throughput. This situation can be improved by using frame based traffic policing methods, but most of the times these have the disadvantage, that a number of cells of the entire frame which should be discarded, already have left the discarding device. Only the cells that still remain within the discarding device can be discarded. A corrupted frame is left then in the communications network. If this corrupted frame is not used anywhere in the communication network, then the presence of this frames also decreases network throughput. As a remark on this frame based policing methods it should be mentioned that there are frame based policing algorithms possible and available not having the disadvantage of leaving corrupted frames within the network. One of those methods is described in the U.S. Pat. No. 5,666,353 with title "Frame based traffic policing for a digital switch". However the disadvantage of this kind of methods is that the network has to support this method end-to-end to avoid incomplete frames within the network. This situation is very unlikely in the near future because it should be agreed and supported by all network operators. Summarising the former, it can be said that applying traffic policing methods in a communication network in general, involves that the frames within the communication network may be incomplete because of a number of different possible problems already mentioned. If such incomplete frames are not used anywhere in the communication network, then the presence of these frames decreases network throughput. This can also be the situation in case of cell discard by network elements like network buffers which discard cells in case of network congestion whereby also corrupted frames are left within the network.

An object of the present invention is to provide a cell discard method of the above known type and related devices adopted to perform this method, but wherein the network throughput is improved.

By marking a frame wherefrom a cell has been deleted, discarding of this frame is facilitated. In this way, all corrupted frames that usually would be transported to its destination node in the prior art system are in the present invention discarded in an early stage, i.e. in the second discarding device, thereby decreasing network load and preventing the network from overload. To discard a marked frame completely, all leftover cells belonging to this frame should be stored in the second discarding device. If this is not the case, network load is reduced to a smaller extent by only discarding those cells which are present in the second discarding device.

However, those remaining cells of the frame, i.e. those are the cells which have left the second discarding device together with the last cell, can be discarded by another coupled second discarding device.

The first discarding device for instance can be a traffic policer. In that case, the criterion to check is a conformance criterion. Alternatively the first discarding device can be a network buffer. In that case, the criterion to check is a congestion criterion.

The corrupted frame indicator can be implemented by assigning a value to a single bit in the end of message cell which indicates the end of the corresponding frame. The meaning of the value 0 or 1 assigned to the bit is the state of the corresponding frame: corrupted or complete or vice versa. This implementation is a preferred solution because the end of message cell is often used in such communication networks whereby also spare bits are reserved for future implementations. By using spare bits of an existing cell no additional traffic is generated.

The above and other objects and features of the invention will become more apparent and the invention itself will be best understood by referring to the following description of an embodiment taken in conjunction with the accompanying drawing that represents the, for the present invention, a relevant part of a Telecommunications network wherein a method for cell discard according to the present invention is applied. The part of a telecommunications network drawn in the FIGURE comprises a first discarding device FDD and a second discarding device SDD which are interconnected and along which a communications path is set-up.

In the following paragraphs, referring to the drawing, the relevant part of the before mentioned telecommunications network will be described wherein an implementation of the method according to the present invention is executed. In the first paragraph the elements of the network in the FIGURE are described, in the second paragraph, the interconnections between all Network elements are defined and in a later paragraph the actual execution of the cell discard method is described.

The first discarding device FDD and the second discarding device SDD are the main elements of the present invention.

In the present invention the first discarding device FDD is built up of the following functional elements, whereby each element is coupled to the next mentioned element. There is at first a checking means CM having an input terminal I being an input terminal of FDD, which checks an incoming cell applied to I, to determine if this incoming cell is in accordance with some predetermined criteria. A second element is the discarding means DM1 which discords a cell when this cell is not in accordance with the predetermined criteria. The third element is the frame marking means FMM, which is able to mark a frame wherefrom at least one cell has been discarded, with a corrupted frame indicator. FMM has an output terminal O which is also an output terminal of FDD. This first discarding device FDD can be a traffic policer TP or alternatively a network buffer NB both having discarding facilities. In case the first discarding device is a traffic policer, the checking according to predetermined criteria is the checking according to conformance related criteria and alternatively in case of a network buffer the checking is a checking according to congestion related criteria.

The traffic policer's TP main task is guarding if the input the network subscriber delivers to the telecommunications network is conforming to agreements made upon this subject between network provider and network subscriber. In case traffic is not conforming the traffic policer TP is taking action to prevent the network from overload and congestion consequently by discarding cells or frames.

The main task of the buffer NB is temporarily storing cells before forwarding them to the downstream network elements. In case of congestion the network buffer NB takes care of incoming cells according to a predefined strategy to handle these cells. In the present invention the second discarding device which is implemented as a network buffer NB', is built up of the following functional elements, whereby each element is coupled to the next mentioned element: The first element is a storage means STM, which is able to temporarily store incoming cells and has an input terminal I' which is also an input terminal of SDD. The second element is the corrupted frame indicator detection means CFDM which detects if a frame is marked with a corrupted frame indicator. The third element is the cell discarding means DM2, which discards cells applied to I'. An output terminal of DM2 O' is also an output terminal of SDD.

The output Q of the first discarding device FDD is coupled to the input I' of the second discarding device SDD.

The output of the second discarding device (network buffer) O' on its turn can be coupled to another network buffer.

In order to explain the operation of the present invention it is assumed that a stream of cells is fed to I of the first discarding device FDD. The second discarding device is a network buffer. First the situation wherein the first discarding device is implemented as a traffic policer is considered.

First the checking if incoming cells are in accordance with one or more predetermined conformance criteria is done. The conformance checking means CM of the traffic policer TP performs its conformance checking according to a predefined policing algorithm. This algorithm may be a cell based or a frame based algorithm. If cells are not conforming to the pre-agreed traffic contract the discarding means DM1 discards the non-conforming cell or cells. The frame to which the discarded cell belongs is corrupted as consequence of this cell discard. When a corrupted frame is kept within the communications network, while not being used anywhere in the network, this frame causes superfluous network load because when the corrupted frame arrives at its destination the entire frame will be retransmitted. As a consequence it is useful to remove the corrupted frame as soon as possible from the network.

This removal is done by first marking each frame that is corrupted. This is done by the frame marking means FMM of the traffic policer TP. The frame is marked by setting a spare bit in the End of Message cell of the corresponding frame representing the corrupted frame indicator. The corrupted frame is then further transmitted to a network buffer NB adjacent to the just described network policer TP. The cells will temporarily be stored within the buffer. The corrupted frame detection means CFDM of the network buffer NB' determines if the frame is corrupted or not by checking if the corrupted frame indicator has been set. If so the entire frame will be discorded by the discarding means DM2 if all cells of the corrupted frame still are within the network buffer. Otherwise, if a part of the corrupted frame has already left the buffer before it is noticed that the meant frame was corrupted, the network buffer will only discard all cells still left within the buffer except for the last cell. The last cell, the End of Message cell is not discarded because it contains the corrupted frame indicator. The cells of the corrupted frame remaining in the communications network, including the End of message cell, may be discarded by the nextfollowing downstream network buffer if possible.

As mentioned before the first discarding device FDD alternatively can be a network buffer NB. This network buffer will for instance in case of network congestion discard cells from a stream of cells. As a consequence the network buffer also leaves corrupted frames in the network. The removal of these corrupted frames is handled in the some way as before described in case of the traffic policer.

The removal of the corrupted frame cannot be done by the traffic policer because of the fact that this traffic policer usually does not buffer cells.

While the principles of the invention have been described above in connection with specific apparatus, it is to be clearly understood that this description is made only by way of example and not as a limitation on the scope of the invention, as defined in the appended claims.

What is claimed is:

1. Method to be used for cell discard in a communications-network through which cells arranged in frames are transmitted, said communications-network including a first discarding device (FDD) coupled to a second discarding device (SDD) to which said cells are supplied, said method comprising:

a. checking incoming cells to determine if said incoming cells are in accordance with at least one predetermined criterion; and b. discarding a cell, if said cell is not in accordance with said predetermined criterion characterised in that said method further comprises the steps of:

c. marking a frame wherefrom said cell has been discarded, with a corrupted frame indicator, by said first discarding device; and d. discarding in said second discarding device, cells of said frame marked with said corrupted frame indicator.

2. A method according to claim 1 characterised in that said first discarding device (FDD) is a traffic policer (TP) which checks the conformance of said incoming cells according to at least one conformance criterion.

3. A method according to claim 1 characterised in that said first discarding device (FDD) is a network buffer (NB) which checks if said network buffer (NB) is congested according to at least one congestion determining criterion.

4. A discarding device (FDD) to be used in a cell based telecommunications-network through which cells arranged in frames are transmitted, said discarding device (FDD) comprising the following means:

a. checking means (CM), adapted to check an incoming cell and to determine if said incoming cell is in accordance with at least one predetermined criterion; and b. discarding means (DM1), adapted to discard a cell when said cell is not in accordance with said predetermined criterion
      characterised in that said discarding device (FDD) further comprises frame marking means (FMM), adapted to mark a frame wherefrom at least one cell has been discarded, with a corrupted frame indicator.

5. A discarding device (FDD) according to claim 4, characterised in that said discarding device (FDD) is adapted to set a bit in an End Of Message cell which belongs to said frame to mark said frame with a corrupted frame indicator.

6. A discarding device (SDD) to be used in a telecommunications network through which cells arranged in frames are transmitted, said discarding device (SDD) comprising the following means:

a. storage means (STM), adapted to temporarily store incoming cells of a frame; and b. cell discarding means (DM2), adapted to discard cells from said frame, characterised in that said discarding device further comprises:

c. corrupted frame indicator detection means (CFDM), adapted to detect if said frame is marked with a corrupted frame indicator, an output of said corrupted frame indicator detection means (CFDM) being coupled to a control input of said discarding means in order to activate said discarding means (DM2) to discard cells of said frame stored in said cell storage means (STM) when said frame is marked with said corrupted frame.

* * * * *